United States Patent
Becher et al.

(10) Patent No.: US 10,281,352 B2
(45) Date of Patent: May 7, 2019

(54) DIAPHRAGM SEAL AND PRESSURE SENSOR HAVING A DIAPHRAGM SEAL

(71) Applicant: Endress + Hauser GmbH + Co. KG, Maulburg (DE)

(72) Inventors: Raimund Becher, Ehrenkirchen (DE); Dietmar Salg, Schopfheim (DE)

(73) Assignee: ENDRESS+HAUSER SE+CO.KG, Maulburg (DE)

( * ) Notice: Subject to any disclaimer, the term of this patent is extended or adjusted under 35 U.S.C. 154(b) by 156 days.

(21) Appl. No.: 15/328,688

(22) PCT Filed: Jun. 8, 2015

(86) PCT No.: PCT/EP2015/062708
§ 371 (c)(1),
(2) Date: Jan. 24, 2017

(87) PCT Pub. No.: WO2016/015907
PCT Pub. Date: Feb. 4, 2016

(65) Prior Publication Data
US 2017/0227412 A1    Aug. 10, 2017

(30) Foreign Application Priority Data

Jul. 28, 2014 (DE) .......................... 10 2014 110 615

(51) Int. Cl.
*G01L 7/00* (2006.01)
*G01L 9/00* (2006.01)
*G01L 19/06* (2006.01)

(52) U.S. Cl.
CPC ................................ *G01L 19/0681* (2013.01)

(58) Field of Classification Search
CPC ... G01L 7/00; G01L 9/00; G01L 19/00; G01L 19/0046; G01L 19/04; G01L 19/06; G01L 19/0645; G01L 19/0681
See application file for complete search history.

(56) References Cited

U.S. PATENT DOCUMENTS 2,481,651 A * 9/1949 Fitzpatrick .......... G01L 19/0627
73/706
3,371,537 A   3/1968 Kiene
(Continued)

FOREIGN PATENT DOCUMENTS

CN      2802486 Y      8/2006
DE      1202027 B  *  9/1965   ........... G01L 9/0036
(Continued)

OTHER PUBLICATIONS

German Search Report, German Patent Office, Munich, DE,—dated Apr. 20, 2015.
(Continued)

*Primary Examiner* — Nguyen Q. Ha
(74) *Attorney, Agent, or Firm* — Bacon & Thomas, PLLC

(57) ABSTRACT

A diaphragm seal for transmitting media pressure, comprising: a diaphragm-carrier body having a media-side surface and a separating diaphragm, which is connected to the diaphragm-carrier body in a pressure-tight manner along at least one periphery. A pressure chamber is formed between the separating diaphragm and the diaphragm-carrier body, and a temperature-isolation body having a channel, which can be filled with a transmission fluid, in order for the pressure chamber of the diaphragm-carrier body attached to a first front side to be connected to a pressure transducer which can be connected to a second front side, so that media pressure prevailing at the separating diaphragm can be transmitted to the pressure transducer. On the temperature-isolation body, on its outer surface, a plurality of successive and, in particular, undulating cooling ribs for emitting heat are formed, and wherein the minimum cross-sectional diameter of the temperature-isolation body between the cooling ribs, which follow one after the other along the section, decrease from the first front side to the second front side.

11 Claims, 3 Drawing Sheets

(56) References Cited

U.S. PATENT DOCUMENTS

| | | | | | |
|---|---|---|---|---|---|
| 3,785,209 | A | * | 1/1974 | Schijf | B29C 45/77 |
| | | | | | 73/706 |
| 4,399,706 | A | * | 8/1983 | List | G01L 9/008 |
| | | | | | 73/114.18 |
| 2013/0263678 | A1 | | 10/2013 | Bastiaan et al. | |
| 2013/0327157 | A1 | | 12/2013 | Verhaagen et al. | |
| 2015/0292972 | A1 | * | 10/2015 | Berberich | G01L 19/0645 |
| | | | | | 73/706 |

FOREIGN PATENT DOCUMENTS

| | | | |
|---|---|---|---|
| DE | 3630618 A1 | 3/1988 | |
| DE | 20006226 U1 | 7/2000 | |
| DE | 10133065 A1 | 1/2003 | |
| DE | 102006049942 A1 | 4/2008 | |
| DE | 102011088303 A1 | 6/2013 | |
| DE | 102014110615 A1 | 1/2016 | |
| GB | 640154 A | 7/1950 | |
| GB | 988218 A * | 4/1965 | G01L 9/0036 |

OTHER PUBLICATIONS

International Search Report, EPO, The Netherlands,—dated Aug. 31, 2015.
English Translation of the International Preliminary Report on Patentability, WIPO, Geneva, CH,—dated Feb. 9, 2017.

* cited by examiner

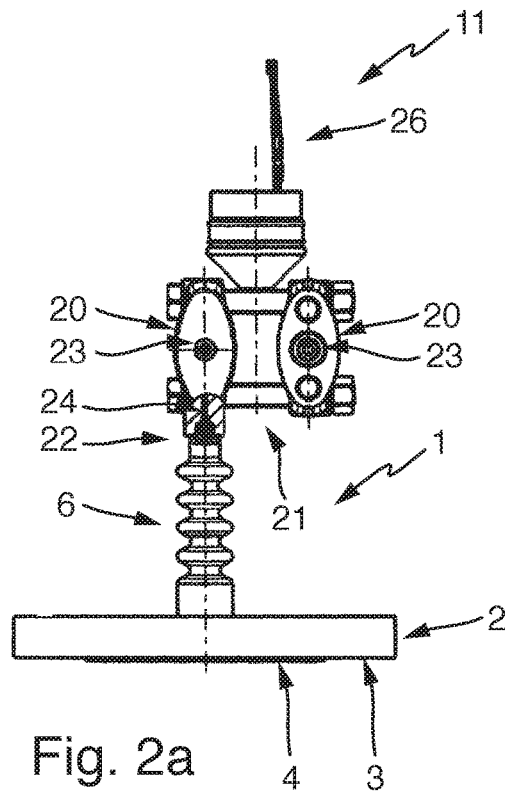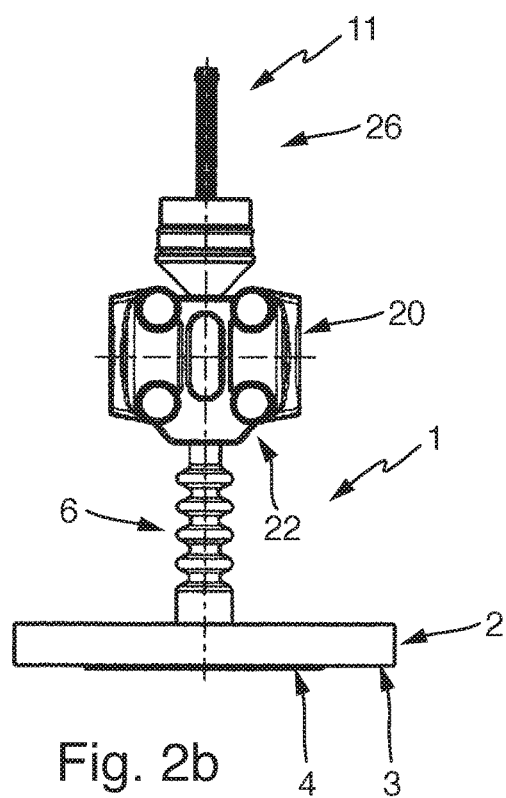
Fig. 2a  Fig. 2b
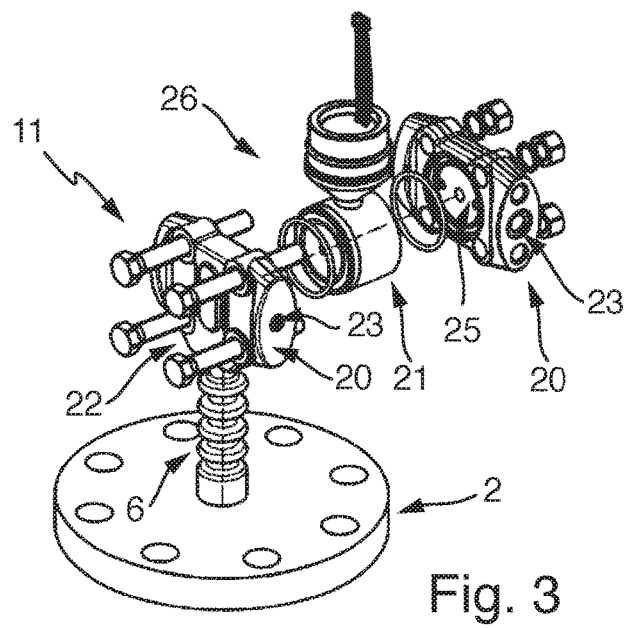
Fig. 3

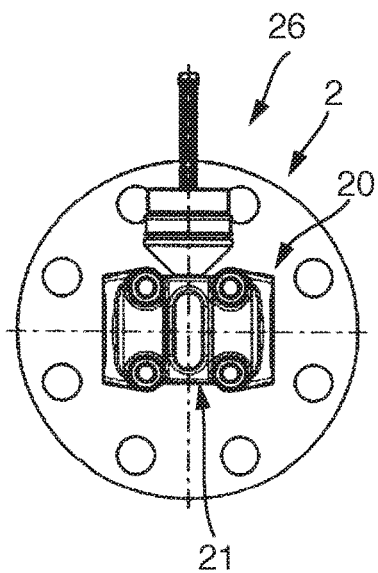
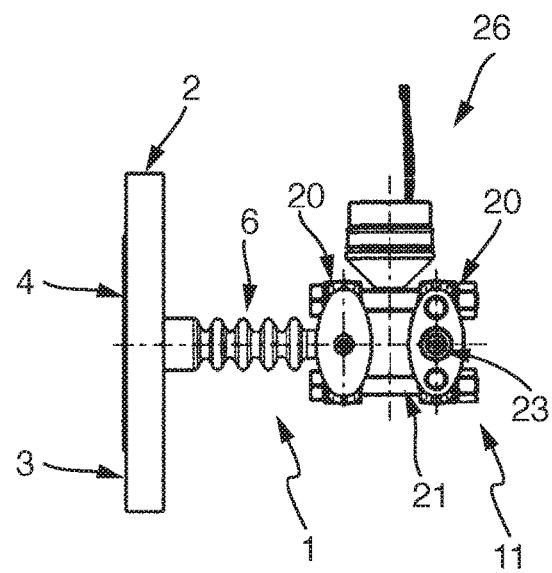
Fig. 4a  Fig. 4b
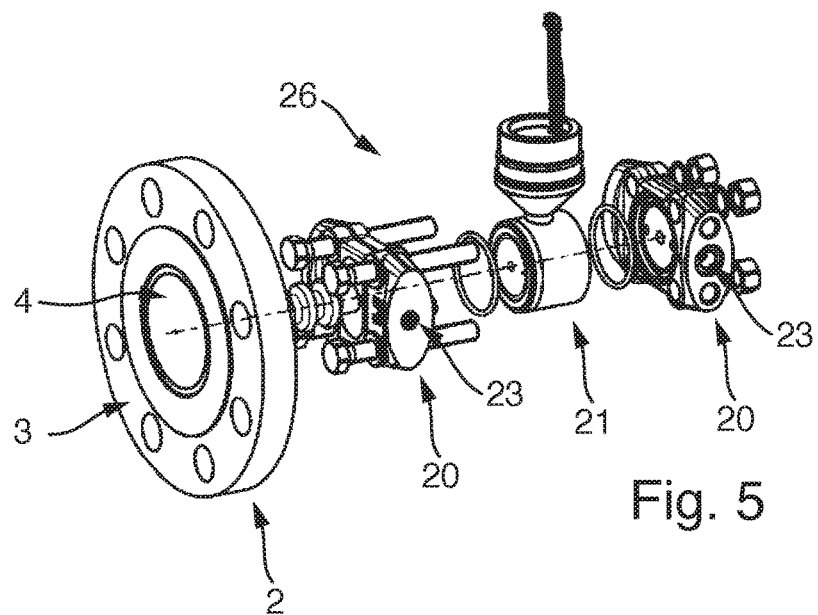
Fig. 5

DIAPHRAGM SEAL AND PRESSURE SENSOR HAVING A DIAPHRAGM SEAL

TECHNICAL FIELD

The present invention relates to a diaphragm seal for transmitting media pressure and to a pressure sensor having such a diaphragm seal.

BACKGROUND DISCUSSION

Diaphragm seals for transmitting media pressure usually comprise a diaphragm-seal body or diaphragm-carrier body having a media-side surface and a separating diaphragm, which is connected to the diaphragm-seal body in a pressure-tight manner along at least one periphery, a pressure chamber being formed between the separating diaphragm and the diaphragm-seal body in the process, wherein a channel extends from the pressure chamber through the diaphragm-seal body, and the pressure chamber and the channel are filled with a transmission fluid in order to transmit media pressure prevailing at the separating diaphragm to a pressure transducer. The pressure transducer may, for example, be a pressure-measuring cell, which is mounted between two process connection flanges, another separating diaphragm, or a capillary line connected to the channel.

Such diaphragm seals are generally used in extremely hot and cold applications in order to thermotechnically isolate the pressure transducer from the process environment. The diaphragm seal fulfills this function by isolating the pressure transducer from the process medium by means of a capillary system, which is filled with transmission fluid and installed in a cooling section.

For this purpose, constructions of diaphragm seals that comprise a variety of components are known from the prior art. These components are a capillary tube, a base body, as well as two capillary tube adapters. The long, curved capillary tube is connected at its first end to the diaphragm-carrier body by means of the first capillary tube adapter and at its second end to the pressure transducer by means of the second capillary tube adapter. Since the capillary tube has an outer diameter of only a few millimeters and is therefore not very stable mechanically, the construction is mechanically stabilized by means of a base body—generally, a U-shaped steel support—which is welded at its first end to the diaphragm-carrier body and at its second end laterally to a process connection flange. In this construction, the capillary tube is curved such that it typically has an S-shape and a first bending radius when starting from the first end and a second bending radius when starting from the second end, wherein the capillary extends essentially linearly in the U-shaped steel support in the region between the two bending radii, i.e., between the U-shaped steel support's flanges, and is thus protected. The U-shaped steel support is used for mechanical stability and is welded on the diaphragm-carrier body to its front side by hand or manually, and at the opposite end, the U-shaped steel support is welded laterally to the process connection flange along the two flanges of the U-shaped profile by hand or manually as well, in order to thus achieve an increased mechanical stability in the region of the welding in this way.

Such diaphragm seals thus require an extremely complex mechanical construction, since the diaphragm seal is made of four individual elements and, further, the U-shaped steel support must be laboriously welded to the diaphragm-carrier body and the process connection flange by hand or manually.

The welding by hand or manually entails, in addition, the risk that the weld joint has small gaps or holes, since the interior of the U-shaped steel support is accessible only with difficulty during welding on the diaphragm-carrier body and/or the pressure transducer. The gaps and holes created in the weld joint in this way subsequently constitute potential corrosion starting points during the long-lasting operation of the pressure transducer (under partially extreme external weather conditions).

It is also disadvantageous in this construction that the axis of vibration of the entire system, i.e., of the diaphragm seal with the diaphragm-carrier body and the pressure-measuring cell, which is mounted between two process connection surfaces, is located at a relatively large distance from the center of gravity of the entire system. This leads to a relatively high imbalance, which results in harmful vibrations and increased wear and tear.

The diaphragm seals known from the prior art further have the disadvantage that they can only be cleaned with difficulty, since the inner regions are not easily accessible as a result of the U-shaped steel support. Specifically in the use of such pressure transducers in the fields of biotechnology and chemistry, easy cleaning is, however, of significant importance.

SUMMARY OF THE INVENTION

It is therefore the aim of the invention to provide a diaphragm seal that overcomes the disadvantages described of the prior art.

The task is solved by a diaphragm seal and a pressure sensor having such a diaphragm seal.

With respect to the diaphragm seal, the aim is achieved according to the invention by a diaphragm seal for transmitting media pressure, comprising:

a metallic diaphragm-carrier body having a media-side surface and a separating diaphragm, which is connected to the diaphragm-carrier body in a pressure-tight manner along at least one periphery, a pressure chamber being formed between the separating diaphragm and the diaphragm-carrier body, and a metallic and, in particular, axially symmetrical temperature-isolation body having a first front side and a second front side facing away from the first front side, as well as a channel extending between the first and second front sides, which channel is or can be filled with a transmission fluid in order for the pressure chamber of the diaphragm-carrier body attached to the first front side to be connected to a pressure transducer which can be connected to the second front side, so that media pressure prevailing at the separating diaphragm can be transmitted to the pressure transducer, wherein, in a section of the temperature-isolation body, on its outer surface, a plurality of successive and, in particular, undulating, cooling ribs for emitting heat are formed, and wherein, further, the minimum cross-sectional diameter of the temperature-isolation body between the cooling ribs, which follow one after the other in the section, decreases from the first front side to the second front side, According to the invention, a diaphragm seal is thus proposed, in which the temperature-isolation body can be manufactured from one piece and which in one section comprises a plurality of cooling ribs, wherein, in the section, the minimum cross-sectional diameter decreases at least between two successive cooling ribs from the first front side, which faces the diaphragm-carrier body, and the second front side, which is associated with the pressure transducer. Generally, the minimum cross-sectional diameter decreases evenly along the radial axis of symmetry from the first front side to the second front side. In this respect, the minimum cross-sectional diameter refers to the diameter at the deepest narrowing or depression between two cooling ribs, wherein the diameter before the first cooling rib toward the first front side and the diameter after the last cooling rib toward the second front side is also included. By means of this "fir tree-shaped profile," a vibration-resistant construction can be realized, since a larger cross-sectional diameter, and thus a larger cross-sectional area, which provides for a load relief, exists in the region of the maximum mechanical load.

Because the temperature-isolation body can be manufactured from one piece, shorter and/or easier manufacturing times and lower associated costs also advantageously result. By means of the design according to the invention, and, in particular, the axially symmetrical temperature-isolation body, the temperature-isolation body can be welded to both the diaphragm-carrier body and the pressure transducer in an automated welding process. As a result of the automated welding process, small gaps and/or holes in the weld joint can be prevented, and the disadvantages mentioned above can thus be avoided.

Another advantage of the diaphragm seal according to the invention is the easy cleanability, since the diaphragm seal no longer has any regions that are only accessible with difficulty.

An advantageous embodiment provides that on the first front surface is a first shoulder having a first diameter, and on the second front surface is a second shoulder having a second diameter, wherein the first and the second diameters are different.

Another advantageous embodiment provides that the channel have a diameter that is in the range of 0.5 mm to 2.5 mm, and preferably in the range of 1 mm to 2 mm.

Another advantageous embodiment provides that the maximum cross-sectional diameter of the temperature-isolation body at the peak of each cooling rib be the same for each cooling rib.

Another advantageous embodiment provides that the ratio between the length of the channel and the diameter of the channel be at least 50:1, preferably 100:1, and particularly preferably 200:1.

Another advantageous embodiment provides that the ratio between the length of the temperature-isolation body and the maximum cross-sectional diameter of the temperature-isolation body be at least 2:1, preferably 3:1, and particularly preferably 5:1.

With respect to the pressure sensor, the aim is achieved according to the invention by a pressure sensor comprising at least the following:
 a diaphragm seal as described in one of the previously described embodiments;
 two essentially rectangular process connection flanges; and
 at least one pressure-measuring cell located between the two process connection flanges, wherein the pressure-measuring cell is connected to the diaphragm seal such that the transmission fluid supplied via the channel of the diaphragm seal is or can be supplied to the pressure-measuring cell via an inlet channel located in one of the two process connection flanges and an inlet chamber, in order to thus generate a pressure-dependent signal using the transmitted media pressure.

An advantageous embodiment of the pressure sensor provides that the diaphragm seal be welded essentially at the center of one of the process connection flange surfaces.

Another advantageous embodiment of the pressure sensor provides that the process connection flange, via which the diaphragm seal is connected to the pressure-measuring cell, have an increased wall thickness, at least in the region where the diaphragm seal is welded to the process connection flange.

Another advantageous embodiment of the pressure sensor provides that the pressure-measuring cell be an absolute pressure measuring cell, a relative pressure measuring cell, or a differential pressure measuring cell.

Another advantageous embodiment of the pressure sensor provides that the inlet channel located in the process connection flange be provided specifically for connecting the diaphragm seal.

BRIEF DESCRIPTION OF THE DRAWINGS

The invention is explained in more detail based upon the following drawings. Illustrated are:
FIG. 2a: is a first lateral view of a first embodiment of the pressure sensor according to the invention;
FIG. 2b: is a second lateral view of the first embodiment of the pressure sensor according to the invention;
FIG. 3: is an exploded view of the first embodiment of the pressure sensor according to the invention;
FIG. 4a: is a first lateral view of a second embodiment of the pressure sensor according to the invention;
FIG. 4b: is a second lateral view of the second embodiment of the pressure sensor according to the invention;
and
 FIG. 5: is an exploded view of the second embodiment of the pressure sensor according to the invention.

DETAILED DISCUSSION IN CONJUNCTION WITH THE DRAWINGS

Figure 1:
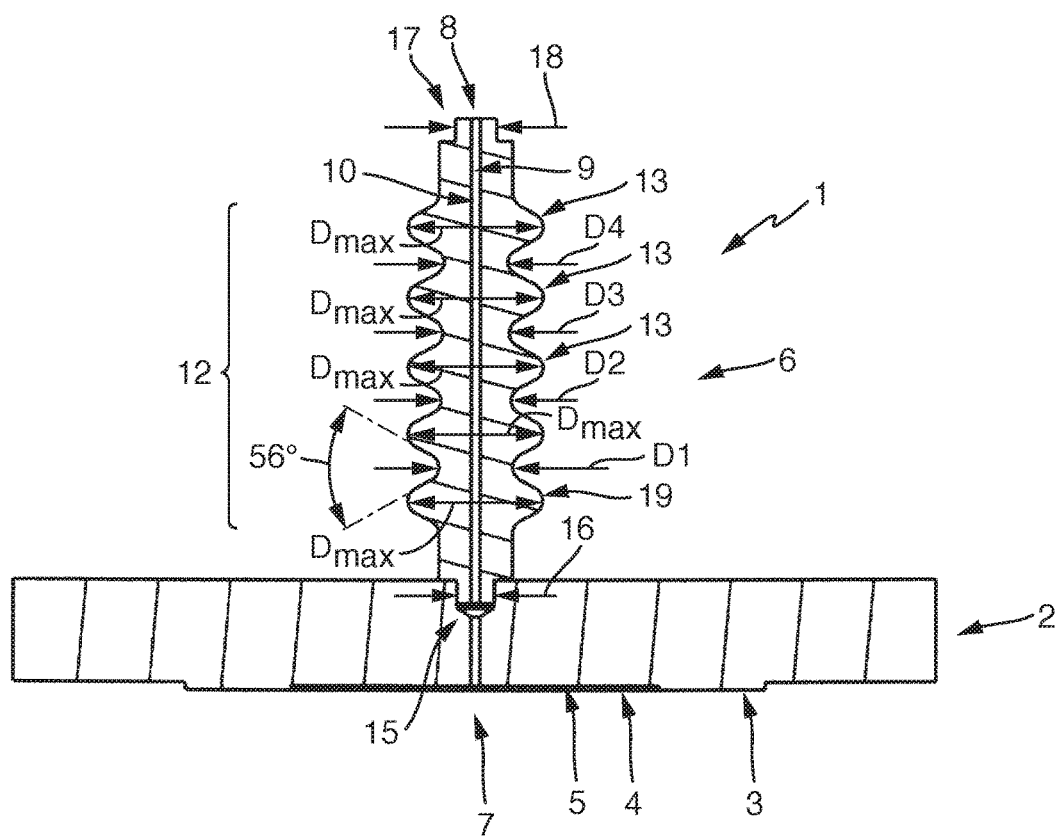
FIG. 1: is a longitudinal view of a diaphragm seal according to the invention.

The diaphragm seal 1, shown in FIG. 1, according to the invention comprises a metallic diaphragm-carrier body 2 and a temperature-isolation body 6, which, as a turned part, is manufactured from a piece of stainless steel and is substantially axially symmetrical. The metallic diaphragm-carrier body 2 has a media-side surface 3 and a separating diaphragm 4, which is connected to the diaphragm-carrier body 2 in a pressure-tight manner along at least one periphery, a pressure chamber 5 being formed between the separating diaphragm 4 and the diaphragm-carrier body 2 in the process.

The metallic temperature-isolation body 6 has a first front side 7 and a second front side 8 that faces away from the first front side 7. At the first front side 7, the temperature-isolation body 6 comprises a first shoulder 15 having a first diameter 16. By means of this shoulder 15, the temperature-isolation body 6 engages with the diaphragm-carrier body 2, which has a recess corresponding to the first diameter 16 of the first shoulder 15. At the second front side 8, the temperature-isolation body 6 also comprises a second shoulder 17 having a second diameter 18. Both shoulders 15, 17 are manufactured in this case such that they have different diameters and that an unintentional change of the mounting direction of the temperature-isolation body 6 in relation to the diaphragm-carrier body 2 and a pressure transducer, which is arranged on the second front side 8, is thus prevented.

The temperature-isolation body 6 further comprises a channel 9, which extends between the first front side 7 and the second front side 8 and which generally is manufactured by means of a bore or erosion. The channel 9 generally has a diameter of 1 mm, since the diaphragm seal 1 has an increased measurement performance in case of such a diameter of the channel 9, due to the small volume of the transmission fluid. However, the diameter of the channel 9 can also possibly be adjusted so that it is in the range of 0.5 mm to 2.5 mm. The channel 9 is filled with a transmission fluid and thus connects the pressure chamber 5 of the diaphragm-carrier body 2 to the pressure transducer in order to thus transmit media pressure prevailing at the separating diaphragm 4 to the pressure transducer in this way.

According to the invention, the temperature-isolation body 6 comprises a plurality of cooling ribs 13, via which at least a partial temperature isolation takes place between the hot temperature of the medium and the temperature of the pressure transducer. The embodiment shown in FIG. 1 has five cooling ribs 13. The number of cooling ribs can, however, be variably adapted to the respective application and can thus deviate from the five cooling ribs 13 shown. In this case, the temperature-isolation body 6 is manufactured such that the first minimum cross-sectional diameter $D_1$ is at a maximum at the first narrowing, along the axis of symmetry extending from the first to the second front side, and that the minimum cross-sectional diameter decreases toward the second front side so that the following relation results:

$$D_1 > D_2 > D_3 > D_4.$$

The cooling ribs 13 are screwed into the substantially axially symmetrical temperature-isolation body 6 so that an undulating design of the upper surface results in the region of the cooling ribs 13. In the configuration shown in FIG. 1, the cooling ribs 13 have an opening angle of 56°, so that they are accessible at any location without difficulty and allow for easier cleaning.

The cooling ribs 13 further have a maximum cross-sectional diameter $D_{max}$ at the peak of the cooling rib 13, which diameter is substantially the same for each of the cooling ribs.

The temperature-isolation body 6 has a length of approx. 100 mm in the axial direction, i.e., from the first front side 7 toward the second front side 8. Accordingly, the channel 9 also has a length of approx. 100 mm. The diameter of the channel 9 is approx. 2 mm. The maximum cross-sectional diameter $D_{max}$, which corresponds to the outer diameter of the temperature-isolation body 6, is approx. 30 mm. Naturally, other dimensions are also conceivable.

FIG. 2a shows a first lateral view of a first embodiment of the pressure sensor 26 according to the invention, and FIG. 2b shows a second lateral view of this embodiment of the pressure sensor 26 according to the invention. In this case, the pressure sensor 26 comprises a diaphragm seal 1 according to the invention, a pressure-measuring cell 21, and two process connection flanges 20, which are essentially rectangular and designed according to the DIN EN 61518 standard of the year 2002. The pressure-measuring cell 21, which can, for example, be an absolute pressure measuring cell, a relative pressure measuring cell, or a differential pressure measuring cell, is mounted between the two process connection flanges 20.

In this case, the diaphragm seal 1 is welded to one of the two process connection flanges 20, wherein this process connection flange 20 is prepared such that it comprises additional material 22 at the welding point compared to a standard process connection flange, so that this lateral surface of the process connection flange 20 has an essentially anvil-shaped characteristic 22. The diaphragm seal 1 is welded essentially at the center of the lateral surface with the anvil-shaped characteristic 22. The process connection flange 20 comprises a specific inlet channel 24 and an inlet chamber 25 (both not shown in FIG. 2a and FIG. 2b), via which the transmission fluid is supplied to the pressure-measuring cell 21. In this way, the media pressure is transmitted, and a pressure-dependent signal is generated. As can be seen well in FIG. 2a, the process connection flanges 20, which are designed according to the DIN EN 61518 standard of the year 2002, comprise a plurality of effective-pressure line connections 23.

According to the invention, the diaphragm seal 1 is, however, connected to the pressure-measuring cell 21, not via one of these effective-pressure line connections 23, but via the specific inlet channel 24, which is additionally located in the process connection flange 20, since a connection via one of the effective-pressure line connections 23 would produce a dead volume that is too large, and the measurement performance of the pressure sensor 26 would thus decrease.

FIG. 3 shows an exploded view of the first embodiment of the pressure sensor 26 according to the invention. In this case, the pressure sensor 26 again comprises a pressure-measuring cell 21, which is mounted between the two process connection flanges 20, and the diaphragm seal 1, which is welded to one of the process connection flanges 20. The design thus corresponds to the explanations in the figure descriptions for FIG. 2a and FIG. 2b.

As already mentioned, both process connection flanges 20 are designed according to the DIN EN 61518 standard of the year 2002.

Both process connection flanges 20 thus have effective-pressure line connections 23 and respectively one inlet chamber 25.

In FIG. 3, the inlet chamber 25 of the process connection flange 20, to which the diaphragm seal 1 is welded, cannot be seen, since it is hidden. The inlet chamber 25 of the process connection flange 20, to which the diaphragm seal 1 is welded, is, however, designed analogously to the inlet chamber 25, which can be seen in FIG. 3, of the process connection flange 20 (to which the diaphragm seal is not welded). The process connection flange 20, to which the diaphragm seal 1 is welded, additionally has the specific inlet channel 24. Via the specific inlet channel 24, the transmission fluid is supplied to the inlet chamber 25, and thus to the pressure-measuring cell 21. The specific inlet channel 24 thus does not correspond to the standardized effective-pressure line connections 23, but to a separate or independent connection, which is used for the fluidic connection of the diaphragm seal 1.

FIG. 4a and FIG. 4b show a first and a second lateral view of a second embodiment of the pressure sensor 21 according to the invention. In this case, the location, to which the diaphragm seal 1 is welded, differs. In the previously described first embodiment, the diaphragm seal 1 is welded to one of the lateral surfaces of the process connection flange 20, whereas the diaphragm seal 1 is welded to a main surface of the process connection flange 20 in the second embodiment. In this respect, one of the two surfaces that has the largest surface area can be regarded as the main surface of the essentially rectangular process connection flange 20, if the process connection flange 20 is considered to be a rectangle. One of the four remaining surfaces, the surface area of which is less or smaller than that of the main surfaces, can thus be considered to be lateral surfaces.

The welding of the diaphragm seal 1 to a main surface of the process connection flange 20 has the advantage that an even better relation of the center of gravity of the pressure sensor 21 to the axis of vibration of the pressure sensor 21 results. In addition, it also advantageously results that an even smaller transmission fluid volume is required compared to the first embodiment (and, naturally, the prior art). This in turn results in an increased measurement performance of the pressure sensor 26.

FIG. 5 shows an exploded view of the second embodiment of the pressure sensor 26 according to the invention, comprising the diaphragm seal 1, the pressure-measuring cell 21, which can be mounted between the two process connection flanges 20.

The invention claimed is:

1. A diaphragm seal for transmitting media pressure, comprising:
   a metallic diaphragm-carrier body having a media-side surface and a separating diaphragm, which is connected to said diaphragm-carrier body in a pressure-tight manner along at least one periphery, a pressure chamber being formed between said separating diaphragm and said diaphragm-carrier body; and
   a metallic, axially symmetrical temperature-isolation body having a first front side and a second front side facing away from said first front side, as well as a channel extending between said first and said second front sides, which channel is or can be filled with a transmission fluid in order for said pressure chamber of said diaphragm-carrier body attached to said first front side to be connected to a pressure transducer which can be connected to said second front side, so that media pressure prevailing at said separating diaphragm can be transmitted to said pressure transducer, wherein:
   in a section of said temperature-isolation body, on its outer surface, several successive and, in particular, undulating cooling ribs for emitting heat are formed, characterized in that the minimum cross-sectional diameter of said temperature-isolation body between said cooling ribs, which follow one after the other in said section, decreases from said first front side to said second front side.

2. The diaphragm seal according to claim 1, wherein:
on said first front side is a first shoulder having a first diameter, and on said second front side is a second shoulder having a second diameter; and said first and said second diameters are different.

3. The diaphragm seal according to claim 1, wherein:
said channel has a diameter that is in the range of 0.5 mm to 2.5 mm, and preferably in the range of 1 mm to 2 mm.

4. The diaphragm seal according to claim 1, wherein:
the maximum cross-sectional diameter of said temperature-isolation body at the peak of each cooling rib is the same for each cooling rib.

5. The diaphragm seal according to claim 1, wherein:
the ratio between the length of said channel and the diameter of said channel is at least 50:1, preferably 100:1, and particularly preferably 200:1.

6. The diaphragm seal according to claim 1, wherein:
the ratio between the length of said temperature-isolation body and the maximum cross-sectional diameter of said temperature-isolation body is at least 2:1, preferably 3:1, and particularly preferably 5:1.

7. A pressure sensor, comprising at least:
a diaphragm seal, comprising: a metallic diaphragm-carrier body having a media-side surface and a separating diaphragm, which is connected to said diaphragm-carrier body in a pressure-tight manner along at least one periphery, a pressure chamber being formed between said separating diaphragm and said diaphragm-carrier body; and a metallic, axially symmetrical temperature-isolation body having a first front side and a second front side facing away from said first front side, as well as a channel extending between said first and said second front sides, which channel is or can be filled with a transmission fluid in order for said pressure chamber of said diaphragm-carrier body attached to said first front side to be connected to a pressure transducer which can be connected to said second front side, so that media pressure prevailing at said separating diaphragm can be transmitted to said pressure transducer, wherein, in a section of said temperature-isolation body, on its outer surface several successive and, in particular, undulating cooling ribs for emitting heat are formed, characterized in that the minimum cross-sectional diameter of said temperature-isolation body between said cooling ribs, which follow one after the other in said section, decreases from said first front side to said second front side;
two essentially rectangular process connection flanges; and
at least one pressure-measuring cell located between said two process connection flanges, wherein:
said pressure-measuring cell is connected to said diaphragm seal such that the transmission fluid supplied via said channel of said diaphragm seal is or can be supplied to said pressure-measuring cell via an inlet channel located in one of said two process connection flanges and an inlet chamber, in order to thus generate a pressure-dependent signal using the transmitted media pressure.

8. The pressure sensor according to claim 7, wherein:
said diaphragm seal is welded essentially at the center of one of said process connection flange surfaces.

9. The pressure sensor according to claim 7, wherein:
said process connection flange, via which said diaphragm seal is connected to said pressure-measuring cell, has an increased wall thickness, at least in the region where said diaphragm seal is welded to said process connection flange.

10. The pressure sensor according to claim 7, wherein:
said pressure-measuring cell is an absolute pressure measuring cell, a relative pressure measuring cell, or a differential pressure measuring cell.

11. The pressure sensor according to claim 7, wherein:
said inlet channel located in said process connection flange is provided specifically for connecting said diaphragm seal.

* * * * *